United States Patent
Keppel et al.

(10) Patent No.: US 9,442,849 B2
(45) Date of Patent: Sep. 13, 2016

(54) APPARATUS AND METHOD FOR REDUCED CORE ENTRY INTO A POWER STATE HAVING A POWERED DOWN CORE CACHE

(71) Applicant: Intel Corporation, Santa Clara, CA (US)

(72) Inventors: David Keppel, Seattle, WA (US); Kelvin Kwan, Santa Clara, CA (US); Jawad Nasrullah, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 13/730,915

(22) Filed: Dec. 29, 2012

(65) Prior Publication Data

US 2014/0189240 A1    Jul. 3, 2014

(51) Int. Cl.
    *G06F 12/12*     (2016.01)
    *G06F 12/08*     (2016.01)
    *G06F 1/32*     (2006.01)

(52) U.S. Cl.
CPC ......... *G06F 12/0804* (2013.01); *G06F 1/3243* (2013.01); *G06F 1/3275* (2013.01); *G06F 12/121* (2013.01); *G06F 12/122* (2013.01); *G06F 2212/1028* (2013.01); *Y02B 60/1225* (2013.01); *Y02B 60/1228* (2013.01); *Y02B 60/1239* (2013.01)

(58) Field of Classification Search
CPC ............. G06F 12/121; G06F 12/0811; G06F 12/122; G06F 12/12
USPC ................................. 711/122, 133, 159, 135
See application file for complete search history.

(56) References Cited

U.S. PATENT DOCUMENTS

| | | | |
|---|---|---|---|
| 5,778,430 A * | 7/1998 | Ish et al. | 711/133 |
| 6,134,634 A * | 10/2000 | Marshall et al. | 711/143 |
| 9,280,190 B2 | 3/2016 | Nasrullah et al. | |
| 2003/0074591 A1 | 4/2003 | McClendon et al. | |
| 2003/0212865 A1* | 11/2003 | Hicken et al. | 711/135 |
| 2005/0218943 A1 | 10/2005 | Padhye et al. | |
| 2009/0265514 A1* | 10/2009 | Biles et al. | 711/154 |
| 2010/0060342 A1 | 3/2010 | Rozen et al. | |
| 2010/0185821 A1* | 7/2010 | Paver et al. | 711/146 |
| 2010/0202235 A1 | 8/2010 | Priel et al. | |
| 2011/0022869 A1 | 1/2011 | Rozen et al. | |
| 2012/0054511 A1 | 3/2012 | Brinks et al. | |
| 2012/0151148 A1* | 6/2012 | Beardsley et al. | 711/129 |
| 2012/0166842 A1 | 6/2012 | Sur et al. | |
| 2012/0254545 A1* | 10/2012 | Beardsley et al. | 711/129 |
| 2013/0015904 A1 | 1/2013 | Priel et al. | |
| 2013/0159630 A1* | 6/2013 | Lichmanov | 711/133 |
| 2013/0346683 A1* | 12/2013 | Walker | 711/105 |
| 2013/0346699 A1* | 12/2013 | Walker | 711/128 |

(Continued)

OTHER PUBLICATIONS

Office action from U.S. Appl. No. 13/333,759, mailed May 20, 2014, 7 pages.

(Continued)

*Primary Examiner* — Than Nguyen
(74) *Attorney, Agent, or Firm* — Nicholson De Vos; Webster & Elliott, LLP (57) ABSTRACT

A method performed by a multi-core processor is described. The method includes, while a core is executing program code, reading a dirty cache line from the core's last level cache and sending the dirty cache line from the core for storage external from the core, where, the dirty cache line has not been evicted from the cache nor requested by another core or processor.

20 Claims, 7 Drawing Sheets

(56) References Cited

U.S. PATENT DOCUMENTS

2014/0156937 A1* 6/2014 Beardsley et al. ............ 711/129
2014/0181413 A1* 6/2014 Manne et al. ................ 711/135

OTHER PUBLICATIONS

Final Office action from U.S. Appl. No. 13/333,759, mailed Oct. 9, 2014, 8 pages.
Office action from U.S. Appl. No. 13/333,759, mailed Feb. 5, 2015, 9 pages.
Final Office action from U.S. Appl. No. 13/333,759, mailed Jun. 10, 2015, 18 pages.
Notice of Allowance from U.S. Appl. No. 13/333,759, mailed Oct. 28, 2015, 5 pages.

* cited by examiner

APPARATUS AND METHOD FOR REDUCED CORE ENTRY INTO A POWER STATE HAVING A POWERED DOWN CORE CACHE

FIELD OF INVENTION

The present invention pertains to the computing sciences, and, more specifically, to an apparatus and method for reduced entry into a core power state having a powered down core cache.

BACKGROUND

Figure 1:
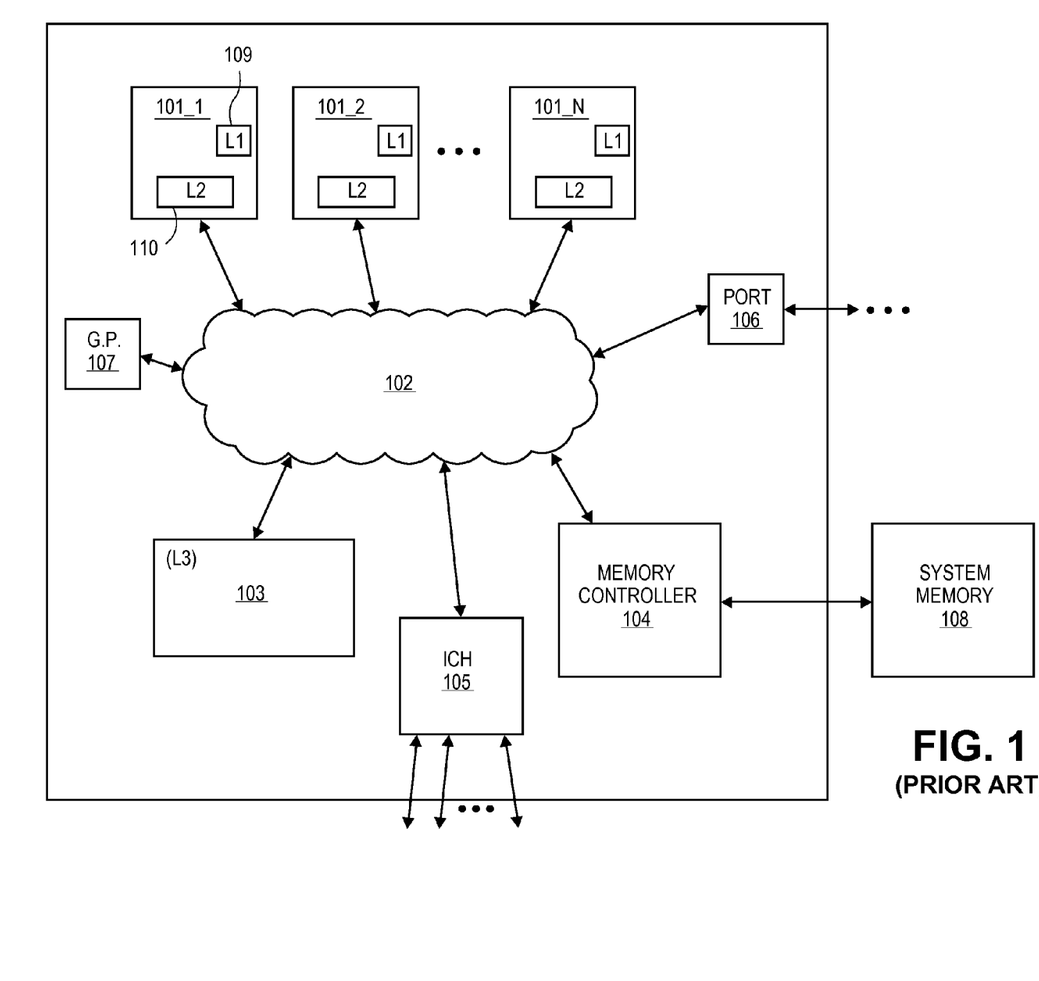
FIG. 1 shows a processor (prior art)

FIG. 1 shows the architecture of a standard multi-core processor design 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores 101_1 to 101_N contain one or more instruction execution pipelines for executing program code instructions. The interconnect network 102 serves to interconnect each of the cores 101_1 to 101_N to each other as well as the other components 103, 104, 105, 106. The last level caching system 103 serves as a last layer of cache in the processor before instructions and/or data are sent to or requested from system memory 108. The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Other functional blocks of significance (phase locked loop (PLL) circuitry, power management circuitry, etc.) are not depicted in FIG. 1 for convenience.

A common processor caching hierarchy includes both L1 and L2 caches 109, 110 within each core, and, the last level cache 103 acting as an L3 or higher level cache. Here, the L1 caching level 109 is tightly coupled to the core's instruction execution pipeline(s). For example, for each instruction execution pipeline with a core, an L1 data cache is tightly coupled to a memory access functional unit within the pipeline's execution stage and an L1 instruction cache is tightly coupled to the pipeline's instruction fetch stage. An L2 cache 109 is resident within the core as the next lower caching level beneath the core's L1 caching level.

FIGURES

The present invention is illustrated by way of example and not limitation in the figures of the accompanying drawings, in which like references indicate similar elements and in which.

DETAILED DESCRIPTION

Write Through V. Write Back Caching Schemes

Figure 2:
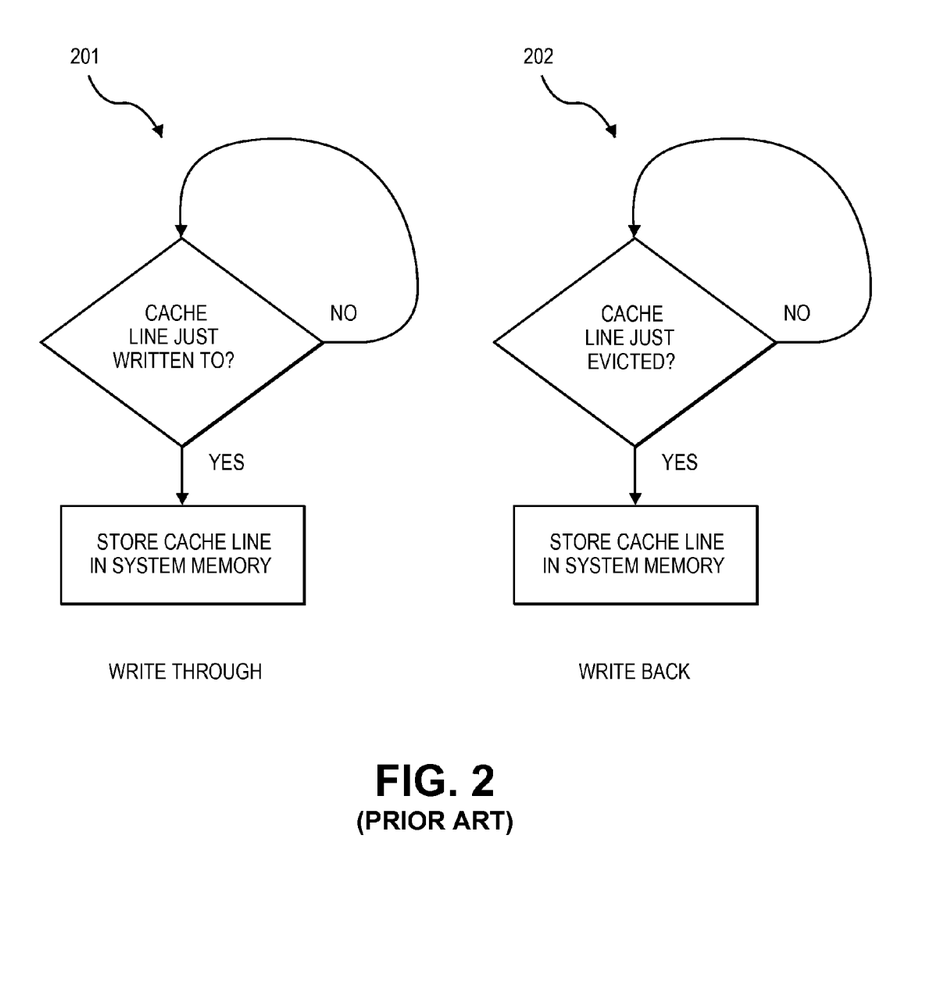
FIG. 2 shows write through and write back caching schemes (prior art)

FIG. 2 shows two different caching schemes. A "write through" caching scheme is depicted in process 201 and a "write back" caching scheme is depicted in process 202. As is known in the art, units of information are typically cached into a cache in the form of a cache line. The contents of a cache line typically include information corresponding to more than one system memory address. A cache is able to store multiple cache lines at any given time and each cache line can be separately retrieved (in the case of a read) or written to (in the case of a write). Modern day processors, such as processor 100, may have multiple caching levels. For example, with respect to FIG. 1, there may be multiple caching levels within each processing core 101_1 to 101_N. Moreover, last level cache 103 may also represent multiple caching levels.

When a cache line is written to, the cache line contains the latest information for the system memory address whose information was written to (referred to as a "dirty" cache line). At some point, system memory will need to be updated with the new information. In the case of a write through caching scheme 201, system memory or at least a deeper caching level is updated immediately with the new information (e.g., immediately after the cache line is written to). In the case of a write back caching scheme 202, neither system memory nor a deeper caching level is updated until the cache line is evicted from the cache (typically to make room in the cache for another cache line that the core needs or is expected to need soon). Many modern processors, such as processor 100 of FIG. 1, adopt a write back scheme 202 because a write through scheme will create too much transactional traffic (e.g. through interconnection network 102) updating memory or deeper caching level(s).

Power States

As the power consumption of computing systems has become a matter of concern, most present day systems include sophisticated power management functions. A common framework is to define both "performance" states and "power" states. A processor's performance is its ability to do work over a set time period. The higher a processor's performance the more work it can do over the set time period. A processor's performance can be adjusted during runtime by changing its internal clock speeds and voltage levels. As such, a processor's power consumption increases as its performance increases.

A processor's different performance states correspond to different clock settings and internal voltage settings so as to effect a different performance vs. power consumption tradeoff. According to the Advanced Configuration and Power Interface (ACPI) standard the different performance states are labeled with different "P numbers": P0, P1, P2 . . . P_R, where, P0 represents the highest performance and power consumption state and P_R represents the lowest level of power consumption that a processor is able to perform work at. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through P_R), the processor must be in the C0 power state. When no work is to be done and the processor is to be put to sleep, the processor can be put into any of a number of different power states C1, C2 . . . C_S where each power state represents a different level of sleep and, correspondingly, a different amount of time needed to transition back to the operable C0 power state. Here, a different level of sleep means different power savings while the processor is sleeping.

A deeper level of sleep therefore corresponds to slower internal clock frequencies and/or lower internal supply voltages and/or more blocks of logic that receive a slower clock frequency and/or a lower supply voltage. Increasing C number corresponds to a deeper level of sleep. Therefore, for instance, a processor in the C2 power state might have lower internal supply voltages and more blocks of logic that are turned off than a processor in the C1 state. Because deeper power states corresponds to greater frequency and/or voltage swings and/or greater numbers of logic blocks that need to be turned on to return to the C0 state, deeper power states also take longer amounts of time to return to the C0 state.

If a processor implements both a write back caching scheme and a sleep state that requires the flushing of cache information (e.g., so the cache can be powered down to conserve energy), the time spent entering the sleep state can be detrimentally long. The problem may be particularly acute as extremely small line width manufacturing technologies are supporting extremely large cache sizes which consume more time to completely flush. For example, a processor may be designed to implement power states that correspond to the powering down of individual processing cores. In the case of processor 100, if a core is to be powered down, the "dirty" cache lines with the core's L1 and L2 caches need to be externally saved (e.g., to L3 last level cache or system memory) as part of the transition to the power state.

Figure 3:
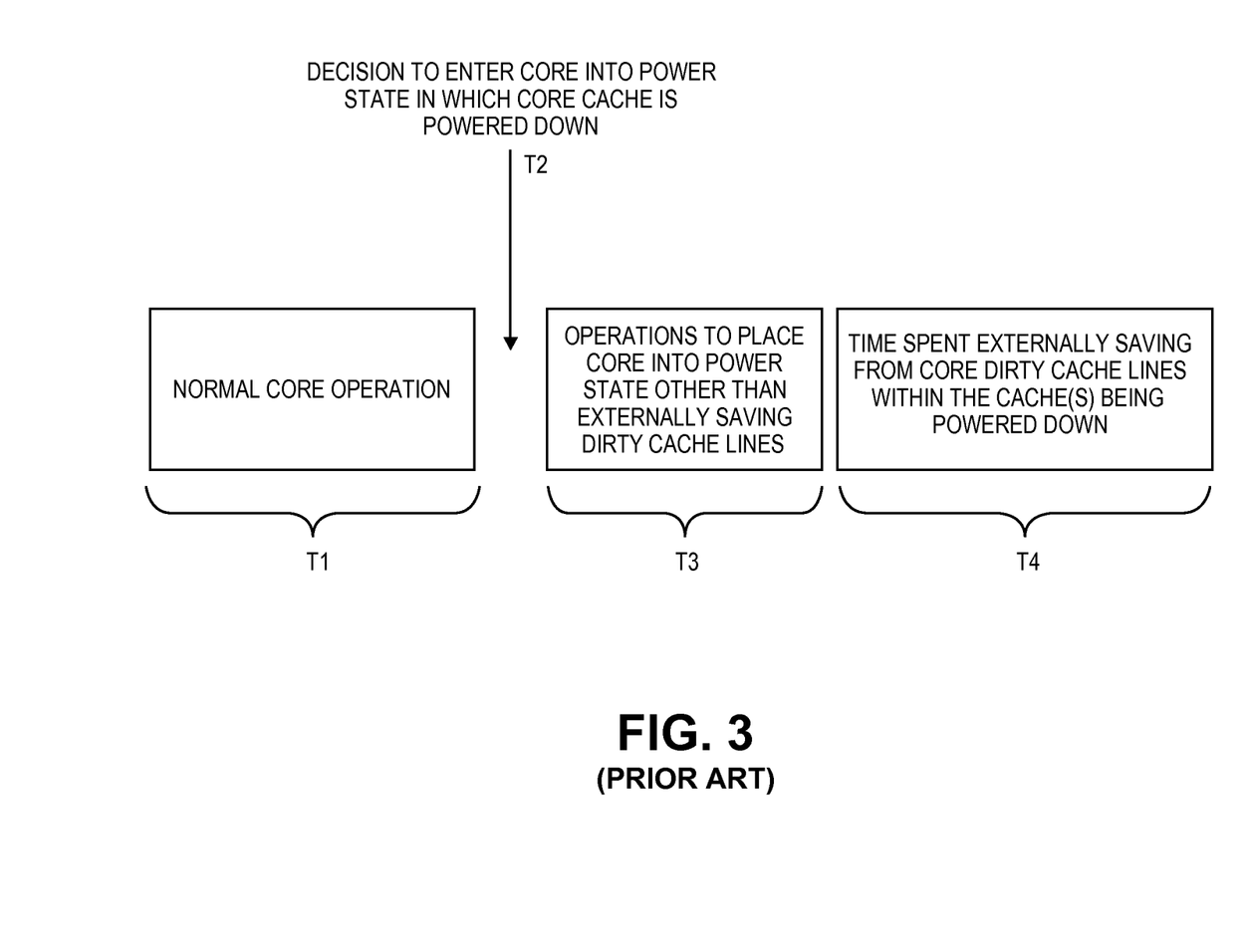
FIG. 3 shows a timing diagram showing the entering of a power state in which a cache is powered down (prior art)

FIG. 3 presents a timing diagram that illustrates this problem in more detail. As observed in FIG. 3, during time T1 the core is operating normally. At time T2 a decision is made to power down the core, or, at least place the core into a power state in which the core's caches are powered down. Time T3 is expended transitioning the core to a powered down state. Here, procedures 301 correspond to all the internal steps taken by the processor to power down the core other than externally saving the dirty cache lines within the core's caches (e.g., saving state information of the core's internal registers, slowing and stopping the core's internal clocks and lowering the core's supply voltage). Procedure 302 corresponds to the time expended externally saving the dirty cache lines within the core's L1 and L2 caches.

As observed in FIG. 3, the combined times T3 and T4 (i.e. the time spent performing shutdown operations other than externally saving cache lines 301 and the time spent saving the dirty cache lines from the L1 and L2 caches 302) effectively determine the transition time needed for the core to enter the powered down power state. In order to hasten the core's transition into a lower power state some reduction of this time should be beneficial.

Concurrent Core Shutdown and Cache Saving

Figure 4A:
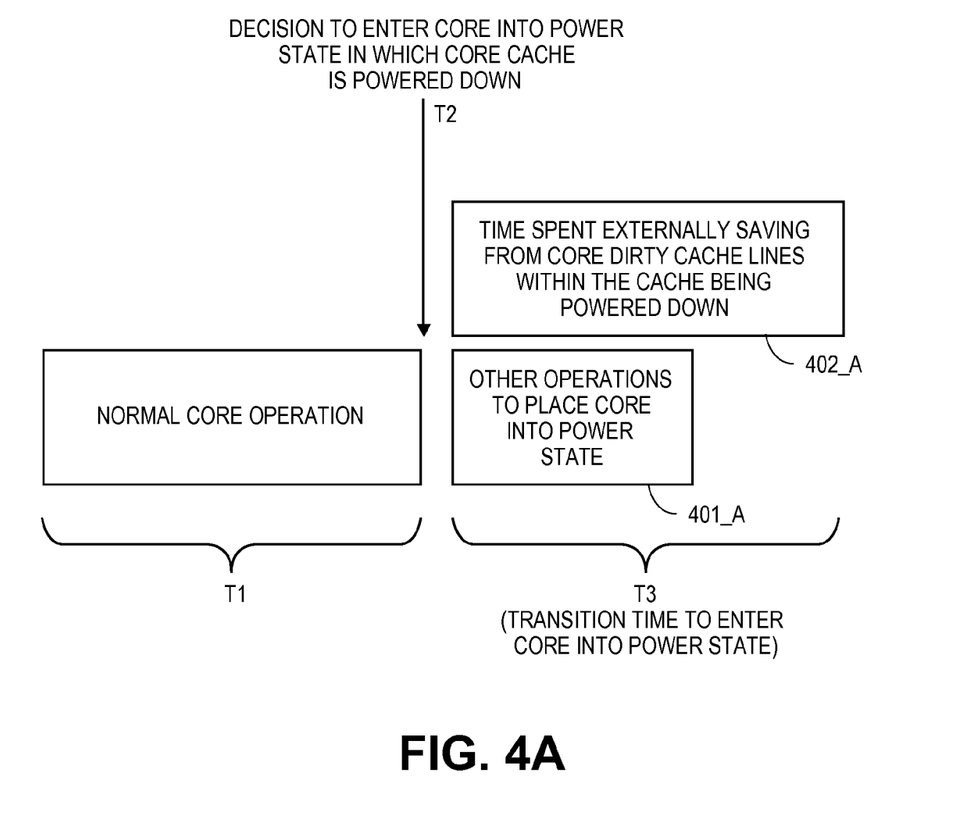
FIG. 4a shows an improved timing diagram in which a cache can be drained over the course of operations used to place the core into a lower power state.

FIG. 4a presents a timing diagram of an improved approach. As observed in FIG. 4a, during time T1 the core is operating normally. At time T2 a decision is made to power down the core, or, at least place the core into a power state in which the core's caches are powered down. Time T3 is expended transitioning the core to a powered down state. Here, procedures 401_A correspond to all the internal steps taken by the processor to power down the core other than externally saving the dirty cache lines within the core's caches (e.g., saving state information of the core's internal registers, slowing and stopping the core's internal clocks and lowering the core's supply voltage). Procedure 402_A corresponds to the time expended externally saving the dirty cache lines within the core's L1 and L2 caches. As such, the two operations 401_A, 402_A are permitted to overlap thereby shortening the time need to fully enter the lower power state.

As observed in FIG. 4A, the time spent saving the dirty cache lines from the L1 and L2 caches 402_B effectively determines the transition time T3 needed for the core to enter the powered down power state. As core cache sizes are becoming even larger, however, this amount of time may begin to impart a significant performance hit to the overall processor as the energy savings of the core being powered down is greatly offset by the time wasted needed to empty caches while the processor is not performing any actual work.

Cache Saving Scheme Between Write Back and Write Through

Figure 4B:
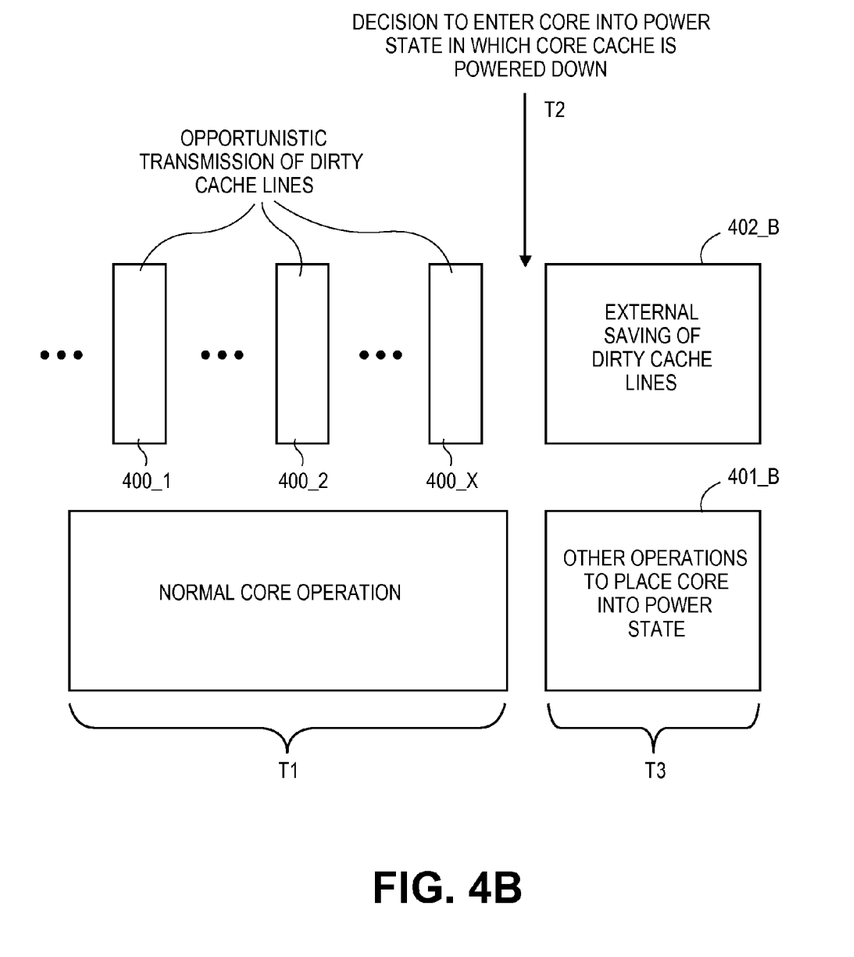
FIG. 4b shows an improved timing diagram in which a cache can be drained over the course of normal processor operation other than purely by cache eviction processes.

FIG. 4b presents a timing diagram for another improved approach that corresponds to a caching scheme that falls somewhere between a write through approach and a write back approach. As observed in FIG. 4b, during normal operation of the core over time T1, before a decision is made to power the core down at time T2, at each of time periods 400_1, 400_2, . . . 400_X, the core opportunistically transmits dirty cache lines externally to, e.g., a deeper layer of cache within the processor or system, or, system memory. That is, while the core is in a power state higher than a power state that requires the core's internal caches to be powered down (such as a power state where the core is executing program code), the core transmits dirty cache lines outside the core at moments deemed appropriate for such transmissions. Notably, unlike typical processes where dirty cache lines may be sent from a core during normal operation, a dirty cache line sent according to the approach of FIG. 4b in many cases has not been evicted from the cache nor has it been requested by another processing core of the processor or another processor.

By so doing, the core is reducing the number of dirty cache lines that will need to be externally saved 402_B during time T3 as part of the core's transition to a power state in which its caches are powered down. With fewer dirty cache lines to write 402_B during the transition period, the length of the time period T3 will be reduced as compared to a system that strictly adheres to a write back caching scheme. As observed in FIG. 4b, ideally, the time spent externally saving dirty cache lines is less than or equal to the amount of time consumed performing the other operations 401_B to power down the core. In this case the time period of the transition is limited no more by the cache line saving activity 402_B than by the other operations 401_B. Although this may be conceivable it is not a requirement. The time period of the transition may still be reduced as compared to FIG. 3 even if the saving activity 402_B remains longer than the other operations 401_B. It is possible that activities associated with "other" shutdown operations 401_B may cause certain state information to be written into local cache during the shutdown process. This "extra" state information will also need to be externally saved which may add to the time expanse of operation 402_B.

Figure 5:
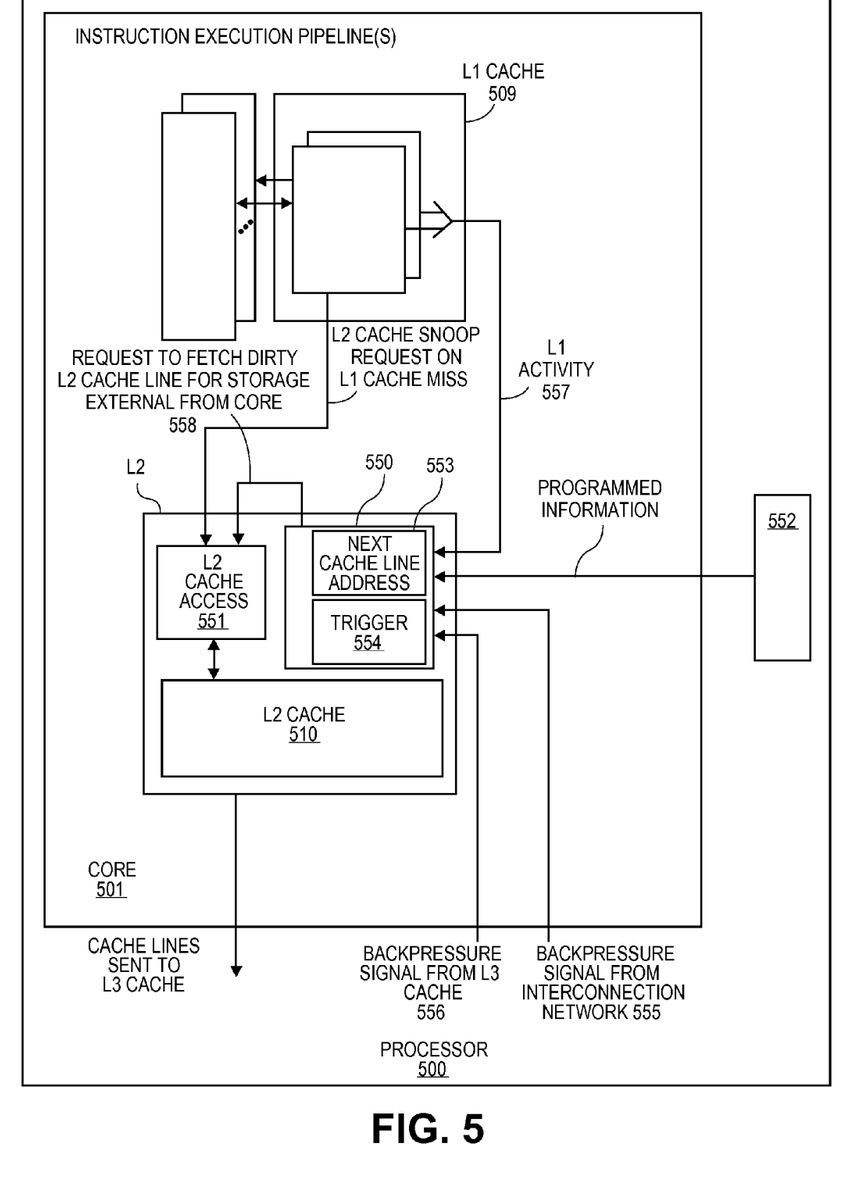
FIG. 5 shows a processor that can implement the timing diagram of FIG. 4.

FIG. 5 shows an exemplary improved processor design 500 having dirty cache line saving logic circuitry 550 to effectively implement a system situated between a write through system and a write back system as discussed above with respect to FIG. 4. As observed in FIG. 5, circuitry 550 contains a first signal line 558 coupled to L2 cache access circuit 551 to trigger the external saving of dirty cache lines from the L2 cache 510. As such, the L2 cache, but not the L1 cache 509, is configured to have its dirty cache lines externally saved consistent with the approach of FIG. 4.

Here, the L2 cache 510 is typically much larger than the L1 cache 509. As such, to the extent there is time savings externally saving dirty cache lines prior to a decision to enter a core power state that causes a core cache to be powered down, the time savings are expected to be dominated by the saving of L2 dirty cache lines and not dirty L1 cache lines (said another way, if the prior art approach of FIG. 3 were attempted, the time consumed externally saving dirty cache lines of the L2 cache is much larger than the time consumed externally saving dirty cache lines of the L1 cache). This approach is just one approach, however. Conceivably more than one cache per core can be configured to behave consistently with the principles of FIG. 4 and the following discussion concerning the operation of logic circuit 550.

As observed in FIG. 5, logic circuit 550 is also coupled to receive various information from various parts of the processor to understand the respective activity levels of those parts so that a judgment can be made as to whether or not it is appropriate to trigger the external saving of a dirty cache line. Essentially, the logic circuit 550 tries to trigger the external saving of a dirty cache line from the L2 cache 510 when doing so would not interfere with the normal operations of the core 501. For example, if logic circuit 550 were to trigger the external saving of a dirty cache line just before the core 501, in executing program code during normal operation, snoops the L2 cache because of an L1 cache miss, the performance of the core would decline because the operation of the program code would be delayed waiting for the dirty cache line to be read from the L2 cache so that it could be saved external to the core.

As such, according to various embodiments, the circuitry 551 used to access the L2 cache 510 may be designed to immediately abandon any presently active reading of a dirty cache line for external saving that would interfere with the servicing of a newly arriving L2 cache snoop so that the servicing of the newly arriving L2 cache snoop is not or is minimally delayed. If the cache access circuitry 551 services requests for cache lines (whether an L2 snoop from an L1 cache miss or a trigger 558 from circuit 550 to externally save a dirty cache line) in a pipelined fashion, the pipeline circuitry may be designed to favor a snoop over a trigger in its first or earliest pipeline stages.

Circuitry 550 however may be designed to collect further intelligence of the core 501 and surrounding processor 500 to attempt to prevent such a situation from occurring. That is, circuitry 550 may be designed to collect intelligence on the current activity of the core 501 to attempt to prevent the issuance of a trigger 558 for the external saving of a dirty cache line that would compete with a L2 cache snoop. For example, circuitry 550 may receive input 557 from the L1 cache 509 to monitor L1 caching activity. In one embodiment, logic circuitry 550 effectively monitors the cache hit/miss activity of the L1 cache 509. According to one possibility, if a hit is detected for the L1 cache 509, logic circuitry 550 will trigger 558 a request to L2 cache circuitry to externally save a dirty cache line from the L2 cache. In a further embodiment, the request will only be triggered 558 if a queue for L2 snoops within L2 access circuitry 551 (not shown) is empty or at least has a state of pending L2 snoops beneath some threshold. Logic circuitry 550 may alternatively or in combination be designed to prevent sending a trigger signal 558 to the L2 cache access circuit 551 in response to an L1 cache miss.

On the back end, logic circuitry 550 may also receive one or more backpressure signals 555, 556 that indicate how busy the L3 (e.g., last level) cache and/or system memory is 556 and/or how busy an interconnect network is that resides between the L2 cache and the L3 cache 555. Here, in an embodiment, if such signals 555, 556 indicate too much activity in the storage target for an externally saved dirty cache line or the communication channel that the cache line will flow through in order to reach its external storage location, logic circuitry 550 will prevent the sending of a trigger signal 558 to the L2 cache.

Other types of monitoring approaches than those discussed immediately above may also be undertaken separately or in combination with those discussed just above. For example, logic circuitry 550 may also collect the following information: 1) the rate at which loads are being presented to the L1 cache; 2) the rate at which stores are being presented to the L1 cache; 3) the rate at which loads are being presented to the L3 cache; 4) the rate at which stores are being presented to the L3 cache; and, 5). Here, for example, an effective measure of overall system activity may be taken by determining a total "score" from a combination of these parameters. If the score is above a threshold, logic circuitry 550 refuses to trigger 558 the external saving of a dirty cache line, whereas, if the score if beneath a threshold the trigger is permitted. Here, if the processor has a high store rate or a high store-to-load rate, the core is usually creating dirty cache lines. Alternatively a rate at which dirty cache lines are created may be monitored. Depending on designer choice, in the face of high store rates or high dirty line creation rates, the core may be designed to be motivated to increase its opportunistic cache cleaning (because more dirty data is being created).

Also, in order to further dampen the threat that externally saving dirty cache lines poses to core/processor performance during normal operation, logic circuitry 550 may be permitted to consider triggering the external saving of a dirty cache line only at periodic time intervals. As such, the longer the periodic time interval, the less frequently dirty cache lines will be externally saved from the core 501. The periodic time interval may be set by software and/or firmware and programmed into the processor. Here, register circuitry 552 corresponds to the register space that may be programmed into the processor by software/firmware to determine the behavior of logic circuitry 550 so as to permit software/firmware to set the periodic interval as well as any other parameter, such as any of the activity thresholds discussed just above. By permitting any such timing parameters or activity thresholds to be programmable, software/firmware is able to influence the trade-off between overall processor/core performance and processor/core power state entry transition time.

The circuitry of FIG. 5 could also be designed to perform the shutdown procedure of FIG. 4a by starting cache cleaning operations only after a decision to power down an internal cache is made where the cache cleaning operations are permitted to operate in parallel with the other core shutdown operations. In an embodiment the processor provides the user (e.g., an actual person, an operating system, application software, or any combination of these) with a choice of which mode to utilize (the mode of FIG. 4a or the mode of FIG. 4b) through, for example, programmable model specific register (MSR) space. In an alternative or combined embodiment the cache cleaning mechanism is chosen indirectly through a user selection of a higher level mode. For example, a user may program into a register space a high performance low energy efficiency processor mode that causes the approach of FIG. 4a to be enabled, or, a lower performance higher energy efficiency processor mode that causes the approach of FIG. 4b to be enabled.

Figure 6:
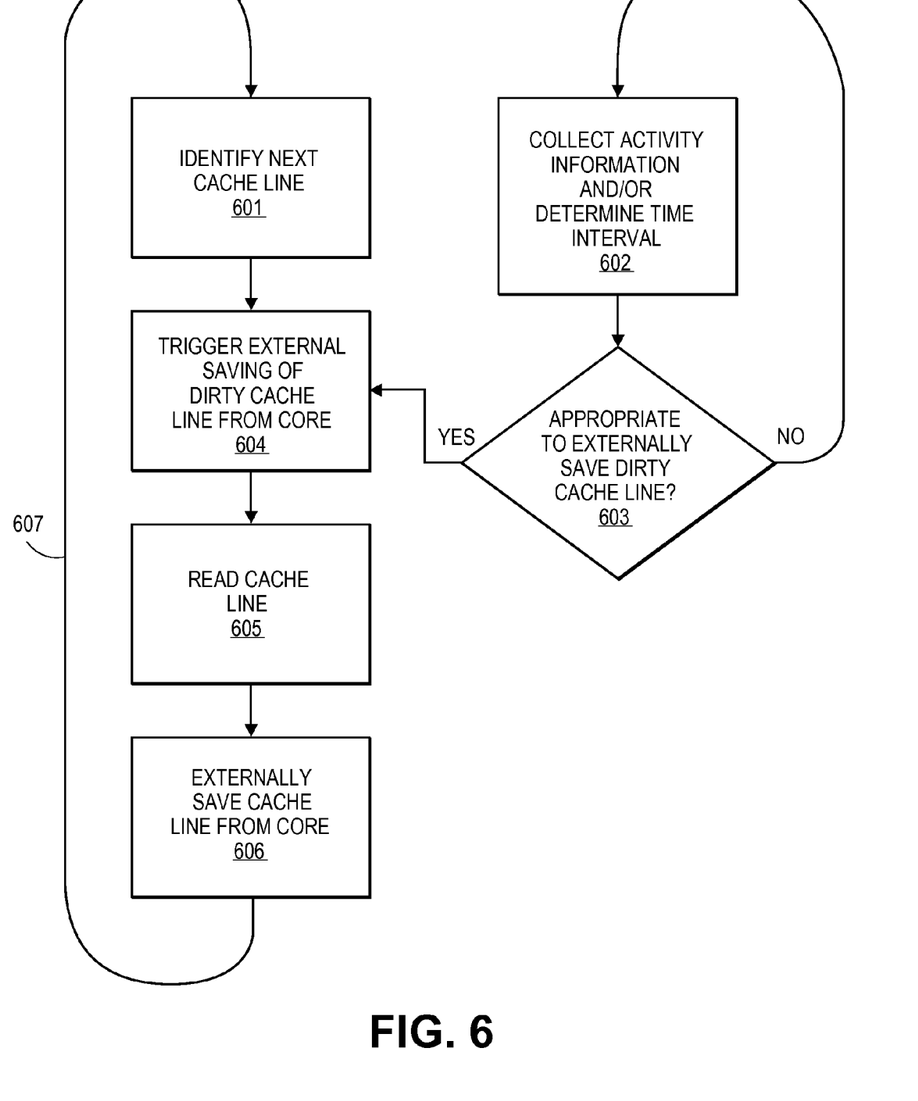
FIG. 6 shows a methodology that can be performed by the processor of FIG. 5.

FIG. 6 shows an example of operation of the logic circuitry 550 of FIG. 5. According to the flow diagram of FIG. 6, logic circuit 550 identifies 601 a next cache line in the L2 cache for external saving from the core (prior to a determination that the L2 cache needs to be powered down). As such, circuitry 550 is observed having next cache line address determination circuitry 553. According to one approach, process 601 is performed by circuitry 553 with an address counter that increments up from the immediately prior address to a next address by a fixed offset (here, the term "address" is understood to include a "tag" that identifies a particular cache line).

As an ongoing continuous process, trigger circuitry 554 of logic circuitry 550 is also collecting activity information of the core 500 and/or its surroundings, and/or, calculating a time interval 602. Either or both of these actions are used to make a judgment 603 as to whether or not it is appropriate to trigger 604 the external saving on a next dirty cache line.

Upon trigger circuitry 554 determining that it is presently an appropriate time, circuitry 550 formulates a trigger signal 558 having the next cache line address that ultimately causes L2 cache access circuitry 551 to read the cache line identified by the address. The L2 cache access circuitry 551 reads the cache line 605 and views its dirty bit to see if the cache line is dirty or not (as is known in the art, cache lines are typically stored with an appended "dirty bit" to indicate whether the cache line has been written to or not). If the cache line is dirty, the cache line is externally saved (e.g., in a next level of cache such as L3 cache or system memory) 606 and the process repeats 607.

If the cache line is not dirty, depending on design, or perhaps configuration through register space 552, the opportunity to externally save a dirty cache line is dropped for this go-around, or, cache access circuitry 551 is permitted to read next cache line(s) from cache until a dirty cache line is found, or, cache access circuitry 551 is permitted to read next cache line(s) up to some limit before dropping the opportunity. In another approach, logic circuitry 550 monitors cache access circuitry 551 over the course of the core's usage of it and keeps a table (not depicted) that tracks which cache lines (and their associated addresses) have been written to after first entering the cache (thereby making them dirty) and have not yet been evicted. By so doing, the table identifies which cache lines in the cache are dirty. As such, the next address process 601 of FIG. 6 is implemented by looking up a next cache line address from the table.

In another approach, the backpressure signals 555, 556 that monitor the activity level of the external storage area where the dirty cache line is saved and/or the path over which the dirty cache line will travel to reach the external storage are used to "gate" the sending of a dirty cache line that has been read from the L2 cache. That is, the monitoring of the core is decoupled from the monitoring of the backpressure signals such that only monitors of the core (e.g., L1 activity level) is used to determine whether it is appropriate to read a next dirty cache line, and, only backpressure monitors are used to determine whether it is appropriate to send a dirty cache line that has been read from the L2 cache forward for storage external to the core. For data consistency reasons, in an embodiment, if the backpressure monitoring indicates that the dirty cache line should not be forwarded to external storage area, the dirty cache line is dropped and the sequence deemed a missed opportunity.

For any of the embodiments discussed above, when dirty cache line is in fact forwarded to external storage, the "dirty bit" for that cache line is cleared in whatever mechanism is used to track whether a cache line is dirty or not (e.g., the dirty bit that is appended the cache line data itself, the aforementioned table in logic circuitry 550 that tracks which cache lines are dirty, etc.). Clearing the dirty bit will prevent the cache line from being "re-saved" to external storage as part of the core's transition to a state having a powered down cache.

Although the discussion above has been written specifically for the "draining" of an L2 cache within a core of a processor having an L3 cache outside of the core, those of ordinary skill will appreciate that the ideas and concepts are readily extendable to other caching levels of a core. Moreover, those of ordinary skill will appreciate that each core with a multi-core processor can be designed to drain their respective caches consistent with the teachings and concepts provided above.

Although logic circuitry 550 has been discussed above in terms of being implemented as dedicated hardware, conceivably it may be partially or wholly implemented in some form of program code such as program code executed by a micro-controller resident in the core or processor. That is, logic circuitry 550 may be partially or wholly implemented as a micro-controller having associated memory that it operates out of.

In another implementation of the approach of FIG. 4a a signal is sent to the core (e.g., by power management hardware and/or software and received in register space of the core) that the core will or "might" be shutdown. In response to the reception of this signal, the core's opportunistic cache cleaning transmission rate is increased.

As any of the logic processes taught by the discussion above may be performed with a controller, micro-controller or similar component, such processes may be implemented with program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a core comprising circuitry to repeatedly read a next cache line from a cache internal to said core at periodic time intervals to determine if the next cache line is a dirty cache line and send said dirty cache line from said cache to a storage external to said core in response to a first activity level of the cache internal to the core and a second activity level of the storage external to the core collected by the circuitry.

2. The processor of claim 1 wherein said cache is an L2 cache.

3. The processor of claim 2 wherein said circuitry is coupled to an L1 cache within said core and is to send the dirty cache line from the core to the storage external to the core in response to a third activity level of the L1 cache, the first activity level of the L2 cache, and the second activity level of the storage external to the core collected by the circuitry.

4. The processor of claim 1 wherein said circuitry is to send the dirty cache line from the core to the storage external to the core in response to a total score, determined by the circuitry from a combination of the first activity level and the second activity level, not exceeding a threshold.

5. The processor of claim 1 wherein said circuitry is to send the dirty cache line from the core to the storage external to the core in response to a determination that the first activity level of the cache does not exceed a first activity threshold and that the second activity level does not exceed a second activity threshold.

6. The processor of claim 1 wherein said circuitry is to receive a backpressure signal from circuitry having a path from said core to said storage and is to send the dirty cache line from the core to the storage external to the core in response the first activity level of the cache, the second activity level of the storage external to the core, and the backpressure signal from the circuitry having the path from the core to the storage.

7. The processor of claim 1 further comprising register circuitry to hold one or more values to control the periodic time intervals to determine if the next cache line is the dirty cache line.

8. The processor of claim 1 wherein said first activity level and said second activity level includes:
a rate of stores;
a rate of loads; and
a rate of creation of dirty cache lines.

9. The processor of claim 1 wherein the circuitry is to repeatedly read the next cache line and send the dirty cache line to the storage before a decision is made to enter the core into a power state where the cache is powered down.

10. The processor of claim 1 wherein the circuitry is to repeatedly read the next cache line and send the dirty cache line to the storage while the core is active.

11. A method performed by a processor, comprising:
repeatedly reading a next cache line from a cache internal to a core of the processor at periodic time intervals to determine if the next cache line is a dirty cache line;
collecting a first activity level of the cache and a second activity level of a storage external to the core; and
sending said dirty cache line from said cache to the storage external to said core in response to the first activity level of the cache and the second activity level of the storage external to the core.

12. The method of claim 11 further comprising clearing information indicating that said dirty cache line is dirty.

13. The method of claim 11 wherein said cache is an L2 cache and the processor includes an L1 cache within said core; and
the sending comprises sending the dirty cache line from the core to the storage external to the core in response to a third activity level of the L1 cache, the first activity level of the L2 cache, and the second activity level of the storage external to the core.

14. The method of claim 11, further comprising determining a total score from a combination of the first activity level and the second activity level, wherein the sending comprises sending the dirty cache line from the core to the storage external to the core in response to the total score not exceeding a threshold.

15. The method of claim 11 further, wherein the sending comprises sending the dirty cache line from the core to the storage external to the core in response to a determination that the first activity level of the cache does not exceed a first activity threshold and the second activity level does not exceed a second activity threshold.

16. The method of claim 11 further comprising receiving a backpressure signal from circuitry having a path from said core to said storage, wherein the sending comprises sending the dirty cache line from the core to the storage external to the core in response to the first activity level of the cache, the second activity level of the storage external to the core, and the backpressure signal from the circuitry having the path from the core to the storage.

17. The method of claim 11 further comprising storing one or more values in register circuitry of the processor to control the periodic time intervals to determine if the next cache line is the dirty cache line.

18. The method of claim 11 wherein said collecting includes collecting:
a rate of cache stores;
a rate of cache loads; and
a rate of creation of dirty cache lines.

19. The method of claim 11 comprising repeatedly reading the next cache line and sending the dirty cache line to the storage before a decision is made to enter the core into a power state where the cache is powered down.

20. The method of claim 11 comprising repeatedly reading the next cache line and sending the dirty cache line to the storage while the core is active.

* * * * *